United States Patent [19]

Mayhan et al.

[11] Patent Number: 4,595,632
[45] Date of Patent: Jun. 17, 1986

[54] FLUOROCARBON GRAFTING OF POLYMERIC SUBSTRATES

[75] Inventors: Kenneth G. Mayhan, Irvine, Calif.; Robert A. Janssen, Eden Prairie, Minn.; Roger F. Drake, Costa Mesa, Calif.

[73] Assignee: American Hospital Supply Corporation, Evanston, Ill.

[21] Appl. No.: 577,300

[22] Filed: Feb. 6, 1984

[51] Int. Cl.$^4$ ................... B32B 27/28; B32B 25/16
[52] U.S. Cl. .................... 428/409; 428/421; 428/422; 428/492; 428/521; 525/126; 525/333.2; 525/355; 525/383
[58] Field of Search ............... 525/355, 356, 383, 126, 525/333.2, 329.3; 428/409, 421, 422, 492, 521; 260/404.5; 252/54

[56] References Cited

U.S. PATENT DOCUMENTS

| | | | |
|---|---|---|---|
| 1,826,275 | 10/1931 | Dyche-Teague | 525/356 |
| 2,005,320 | 6/1935 | Konrad et al. | 525/356 |
| 3,322,721 | 5/1967 | Howard | 525/153 |
| 3,332,812 | 7/1967 | Guthrie | 525/333.2 X |
| 3,340,281 | 9/1967 | Brannen | 260/404.5 |
| 3,351,663 | 11/1967 | Guthrie | 525/333.2 |
| 3,369,012 | 2/1968 | Lundberg | 525/332.3 |
| 3,480,549 | 11/1969 | Carlos et al. | 252/54 |
| 3,480,609 | 11/1969 | Frew, Jr. | 525/333.2 |
| 3,714,297 | 1/1973 | Blaise et al. | 525/126 |
| 3,842,053 | 10/1974 | Villa et al. | 525/329.3 |
| 4,404,256 | 9/1983 | Anand et al. | 525/355 X |

Primary Examiner—Thomas J. Herbert
Attorney, Agent, or Firm—Tilton, Fallon, Lungmus

[57] ABSTRACT

A process for modifying the surface of a preformed polymeric substrate to impart lubricity and other desired properties thereto, without at the same time significantly altering the bulk properties of the substrate, by epoxidizing the substrate's surface and reacting the epoxide groups so formed with a fluorocarbon capable of cleaving the epoxide rings and covalently bonding thereto. The article so formed is also disclosed.

23 Claims, 4 Drawing Figures

FLUOROCARBON GRAFTING OF POLYMERIC SUBSTRATES

BACKGROUND

Articles formed of solid or semi-solid polymers frequently have surface characteristics that detract from and at least partially offset the advantages of the bulk properties of the polymers. In the past, such deficiencies have sometimes been reduced by applying surface coatings or treatments, or by utilizing protective packaging. For example, latex articles used for medical purposes may be coated with lubricants to reduce frictional resistance, hermetically packaged to retard deterioration and pinhole development, powdered to reduce blocking, etc. Such measures often create additional complications and risks, and are not always effective or even applicable. Thus, coating a latex catheter with a lubricant jelly to reduce friction not only imposes an undesirable burden on the medical practitioner or user but creates additional risks of contamination, possible bioincompatability, interferences with catheter porting and operation, and the like.

The prior art discloses various chemical reactions in which fluorocarbon entities have been grafted to polymers; however, in such reactions the polymers have generally been in solution during treatment and the resulting products have been substantially homogeneous in composition. Applicants are unaware of prior teachings in which an article composed of a preformed solid or semi-solid polymeric substrate is grafted only along one or more of its surfaces to acquire the surface properties of a fluorocarbon while simultaneously retaining the bulk properties of the polymeric substrate. Reference may be had to the following patents of interest: U.S. Pat. Nos. 3,322,721, 3,842,053, 1,826,275, 2,005,320, 3,480,609, 3,714,297, 3,332,812, 3,340,281, 3,351,663, 3,369,012, and 3,480,549. Certain of these references (U.S. Pat. Nos. 1,826,275, 2,005,320, 3,480,609, 3,714,297) are of additional interest because they disclose the epoxidation of synthetic or natural rubber, although such references are concerned more with the compounding of rubber and do not disclose grafting processes for converting only the surface of a preformed solid polymeric substrate.

SUMMARY

One aspect of this invention lies in the discovery that the surface characteristics of an article formed of a solid or semi-solid polymeric substrate containing aliphatic carbon-carbon unsaturation may be altered by fluorocarbon grafting at the surface without at the same time significantly altering the bulk properties of the substrate. The physical properties at the treated surface of the article may thus be altered to provide or enhance lubricity, increase ozone resistance, and provide other desired surface characteristics, without significantly reducing the stretchability, durability, dimensional stability, and other physical, chemical, and mechanical properties of the base substrate. Moreover, in some cases it has been discovered that the properties of the base substrate may be markedly improved, as where the grafted fluorocarbon surface protects the underlying polymeric structure against ozone deterioration and pinhole formation. Surprisingly, the permeability of elastomeric substrates occasioned by pinhole development or other causes has even been found to be reduced when the surface of such a substrate is fluorocarbon-grafted in accordance with this invention.

In brief, the process involves the steps of epoxidizing the surface of an article formed of a solid (or semi-solid) polymeric material containing aliphatic carbon-carbon unsaturation, such epoxidation taking place without significantly altering the sub-surface structure of the substrate, and then reacting the epoxide groups so formed with a fluorocarbon capable of cleaving the epoxide rings and covalently bonding thereto. The substrate may be composed of a wide variety of elastomeric or non-elastomeric polymers, although it is essential that the polymeric substrate contains carbon-carbon double bonds and be a solid or semi-solid at room temperatures. The term "semi-solid" is used herein to include materials that have dimensional stability in the absence of external applied forces, and therefore includes materials that would normally be regarded as solids but which are nevertheless pliable and deformable.

Epoxidation is achieved by exposing one or more surfaces of the polymeric article to a peroxy acid, such as, for example, peroxyacetic acid, which is capable of epoxidizing the carbon-carbon double bonds at the surface of the article. A fluorocarbon-containing nucleophile is then grafted onto the surface at the sites of epoxidation. While particularly effective results have been obtained using fluorocarboxylic acids, other aliphatic, aromatic, or alicyclic chemical groups containing one or more fluorine atoms may be used to supply the fluorocarbon graft as, for example, fluorine-containing acetals, acetoacetates, acetonitriles, acetylenes, acid anhydrides, acyl halides, alcohols, aldehydes, alkyl halides, alkyl hydroperoxides, amides, primary amines, secondary amines, tertiary amines, azides, cyanates, ketones, malonates, organomagnesium halides, phenols, phosphines, and phthalimides. Furthermore, the epoxidation and fluorination may be initiated by the same reagent, as where peroxytrifluoroacetic acid is allowed to react with the unsaturated surface of the article to form epoxy groups which are then immediately converted or grafted to form the fluorocarbon ester. Such surface conversion is substantially complete; that is, the grafting step is continued until virtually all of the sites of unsaturation at the treated surface of the article are occupied.

With regard to surface fluoroesterification, it has been discovered that hydrolytic stabilization of the grafted surface may be achieved by exposing that surface to an aqueous solution having a pH within the range of about 8 to 11, and preferably in the range of 9.0 to 10.0, thereby converting diester linkages to a relatively stable hydroxy ester moiety. The relative stability of the hydroxy ester linkage over the diester is believed to be attributable to an intramolecular hydrogen bond between the adjacent hydroxy group and ester linkage.

Other features, advantages, and objects of the invention will become apparent from the specification and drawings.

DETAILED DESCRIPTION OF PREFERRED EMBODIMENTS

Figure 1:
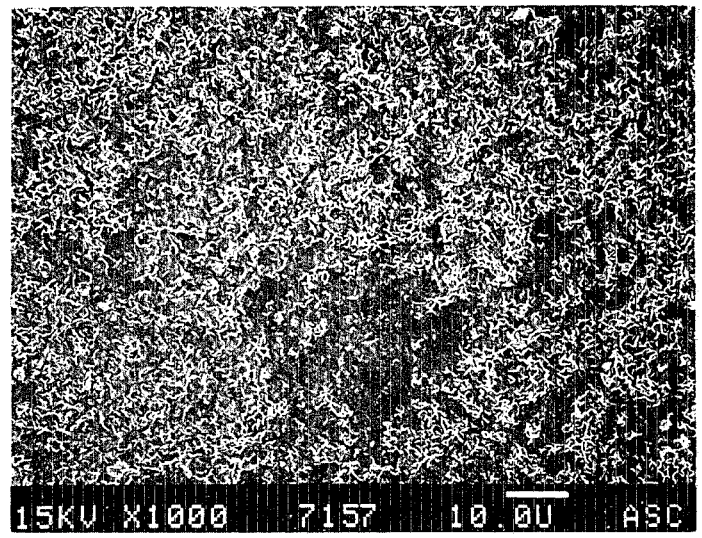
FIG. 1 is a photomicrograph depicting the surface of an ungrafted latex sheet before ozone exposure.

The grafting process involves the steps of epoxidation of a polymer followed by the reaction of the epoxy groups with an appropriate fluorocarbon. Since two reactions are involved, they will be regarded as successive "steps" herein even though in a preferred embodiment described hereinafter the same fluorinated peroxy acid may be used to perform both steps in a continuous or uninterrupted procedure.

The surface conversion is carried out on the surface of a preformed solid or semi-solid article whose surface is capable of being epoxidized. Specifically, the polymeric substrate must be one that contains aliphatic carbon-carbon unsaturation, at least at the surface to be treated. Epoxidation is achieved by exposing the clean surface or surfaces of the article to a peroxy acid at a suitable reaction temperature under 100° C., generally at a temperature within the range of 10° C. to 40° C. Ideally, the reaction proceeds at about room temperature (20° C.). The surface may be prepared for such epoxidation by utilizing any suitable cleaning or leaching solution; effective results have been achieved with substrates formed of natural or synthetic rubber with a leaching solution containing benzene or toluene and isopropyl alcohol.

While the invention is believed to be particularly significant in the treatment of articles formed of natural and synthetic rubbers (i.e., elastomers composed primarily of isoprene and/or butadiene units) because the suitability of such elastomers for many applications would be notably improved if their lubricity and resistance to oxidation were increased, other polymeric substrates, whether elastomeric or not, may be grafted by this process as long as they contain carbon-carbon double bonds at their surface or are capable of being treated to provide such surface unsaturation. For example, articles formed of articles formed of copolymers of acrylonitrile-butadiene-styrene may be effectively grafted by the process. Other polymeric substrates that might be so grafted are dehydrohalogenated PVC, plasticized PVC, and any polymeric substrate which can be made to produce the necessary groups of unsaturation. In addition to providing surface unsaturation, the polymeric substrate should be resistant to swelling, dissolving, or otherwise reacting with the peroxy acid medium except to the extent that it must undergo epoxidation and grafting. Prior cross linking of the polymer chains may be advantageous but is not regarded as prerequisite.

The epoxidized surface of the solid (or semi-solid) substrate may then be grafted by exposing that surface to a solution containing aliphatic, aromatic, or alicyclic chemical groups having one or more fluorine atoms. A preferred grafting solution contains a fluoro-peroxy acid, particularly peroxytrifluoroacetic acid, the reactions being represented as follows:

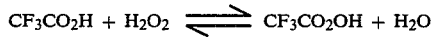

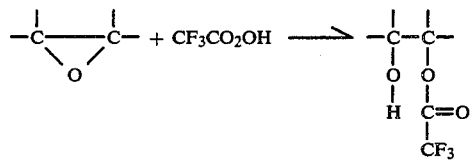

The use of peroxytrifluoroacetic acid as the grafting medium is particularly advantageous because the same acid solution may be used to epoxidize the surface of the substrate. Therefore, peroxidation and grafting may be performed successively in the same acid bath without interruption to yield the hydroxy ester graft indicated above.

As the reaction proceeds the hydroxy ester tends to esterify to the diester and also to hydrolyze to the dihydroxy, as indicated below:

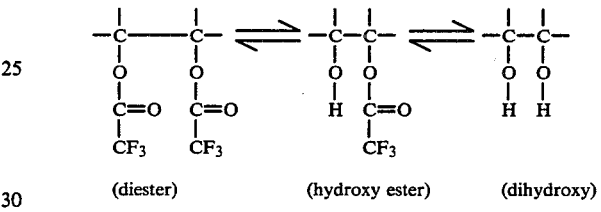

(diester)   (hydroxy ester)   (dihydroxy)

It has been found that the diester is hydrolytically unstable but that the hydroxy ester exhibits a high level of hydrolytic stability, apparently because of an intramolecular hydrogen bond between the adjacent hydroxy group and the ester linkage. The conversion of the diester to the more hydrolytically stable hydroxy ester is accomplished by the further step of placing the fluorocarbon-grafted substrate in an aqueous solution maintained at a pH of about 8 to 11 and preferably in the range of 9.0 to 10.0. Such a reaction proceeds at room temperature and, depending on substrate composition and graft depth, the dwell time of the substrate in the alkaline solution will generally fall within the range of about 1 to 3 hours.

The grafting solution which, in the preferred embodiment given above contains peroxytrifluoroacetic acid, need not be aqueous. Any suitable solvent capable of dissolving the fluorocarbon grafting agent without either impairing the substrate or reacting with the fluorocarbon grafting agent may be used. For example, isopropyl alcohol has been appropriate as a solvent.

Although peroxytrifluoroacetic acid has been found particularly effective as a grafting agent (and also as an epoxidizing agent), any of a variety of agents other than fluorocarboxylic acids may be used to graft fluorocarbon groups onto the epoxidized surface of a preformed substrate, such agents including fluorine-containing acetals, acetoacetates, acetonitriles, acetylenes, acid anhydrides, acyl halides, alcohols, aldehydes, alkyl halides, alkyl hydroperoxides, amides, amines (primary, secondary, or tertiary), azides, cyanates, ketones, malonates, organomagnesium halides, phenols, phosphines, and phthalimides. Reactions for grafting with such agents are represented by the following illustrative equations, in which

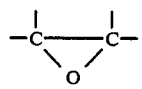

refers to the epoxide groups on the surface of a preformed substrate, and R(F) and R(F') refer to aliphatic, aromatic, or alicyclic chemical groups containing one or more fluorine atoms:

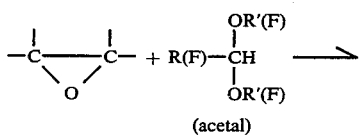
(acetal)

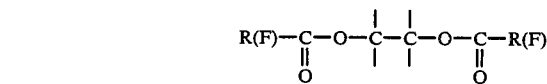

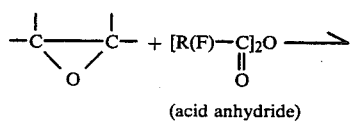
(acid anhydride)

$$R(F)-\underset{\underset{O}{\|}}{C}-O-\overset{|}{\underset{|}{C}}-\overset{|}{\underset{|}{C}}-O-\underset{\underset{O}{\|}}{C}-R(F)$$

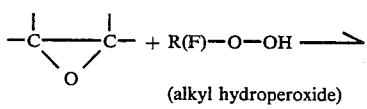
(alcohol)

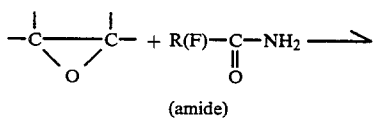
(alkyl halide)

$$-\overset{|}{\underset{\diagdown O \diagup}{C}}\!\!-\!\!\overset{|}{\underset{\phantom{O}}{C}}- + R(F)-O-OH \longrightarrow$$
(alkyl hydroperoxide)

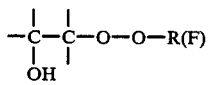

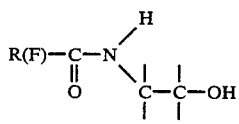
(amide)

$$R(F)-\underset{\underset{O}{\|}}{C}-N\!\!\diagdown\!\!\overset{H}{\underset{\overset{|}{C}-\overset{|}{\underset{|}{C}}-OH}{\phantom{|}}}$$

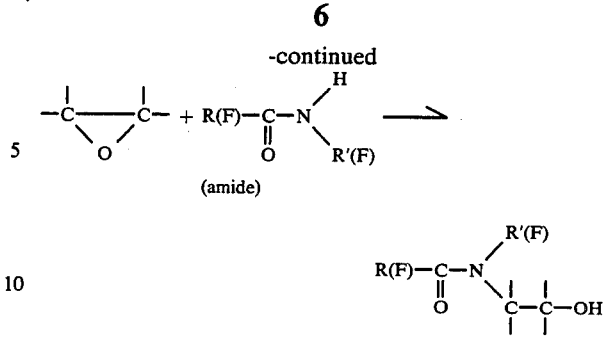

Although the thermodynamic feasibility of all of these reactions is clear, it will be understood that the reaction conditions and solvents will vary depending upon the particular substrate and grafting material selected.

Ideally, the grafting process should continue until substantially all of the reactive sites on the substrate surface to be treated (i.e., all of the sites of unsaturation) are occupied by the fluorocarbon graft. The result is an article having the bulk properties of the substrate and the surface properties of the fluorocarbon graft. In the case of an article formed from an elastomer such as latex, the article retains the original resilience and elasticity, but its treated surface takes on the lubricity and resistance to oxidation of the fluorocarbon. In addition to markedly increasing lubricity and ozone resistance, the fluorocarbon graft reduces the gas permeability of an elastomeric film or sheet, indicating that sub-microscopic pinholes and fissures may in fact be sealed by the dense fluorocarbon graft. Also, to the extent that reactive sites that would otherwise be present on the surface of the substrate are occupied by the fluorocarbon graft, biocompatability is believed to be enhanced.

The invention is further revealed by the following illustrative examples:

EXAMPLE 1

Cured natural latex slabs were leached for one minute in 25 weight percent benzene plus 75 weight percent isopropyl alcohol solution under ambient conditions, although other solvent combinations which adequately clean the surface of the substrate may also be used. The leached slabs were allowed to air dry for 5 minutes under a fume hood. A peroxytrifluoroacetic acid grafting media was prepared by combining one mole trifluoroacetic acid, 3 moles hydrogen peroxide, and 5.5 moles distilled water. The latex slabs were submersed in the grafting media for reaction times of 2, 4, 6, 8, 10, 15, and 30 minutes under ambient conditions.

The grafted slabs were then placed in a pH 9.0 to 9.5 aqueous solution for 2 hours. Sodium hydroxide was used to maintain the desired pH. The effect of such treatment was to add stability to the fluorocarbon graft by hydrolyzing the diester linkage of the graft to the hydroxy ester. The slabs were then rinsed in distilled water for 24 hours to remove excess alkali from the latex. This was followed by air drying for 24 hours prior to testing.

Surface friction tests were conducted upon each of the grafted slabs and the results compared with those conducted on untreated slabs and on Teflon films. The surface friction testing fixture consisted of a flat Teflon-covered plate over which the sample was drawn. A 254 g. finely-polished stainless block was positioned and attached on each sample and connected directly to the load-sensing cell of an Instron Mechanical Tester. The velocity of the sample (2 inches per minute) relative to the block resulted in a dynamic frictional resistance, which was recorded. From that value a frictional coefficient was calculated as follows:

$$\nu = F/N$$

where $\nu$ represents the frictional coefficient of the sample, N is the normal force on the test slab, and F is the frictional resistance force as measured in the Instron.

A ratio of the frictional coefficient of the sample to that of a Teflon film was then computed. For the Teflon film against the block, $\nu$ was computed as 0.067.

The surface friction tests revealed that the coefficient of friction of the grafted surfaces reached a relatively stable equilibrium within a 5-minute reaction time, indicating that substantially all of the sites of unsaturation on the treated surfaces of the slabs were occupied by the fluorocarbon graft within that interval. The data also revealed that such grafted surfaces have approximately one-sixth of the surface friction of an untreated latex surface and five times more than a Teflon surface.

The stress-strain properties of both the untreated slabs and those treated for 6 minutes in the grafting media were then evaluated and no significant differences in the stress-strain properties were found.

EXAMPLE 2

Cured natural latex slabs were leached under ambient conditions for one minute in a leaching solution composed of equal volumes of isopropyl alcohol and toluene. The slabs were then air dried for about one hour and were individually mounted upon rectangular frames measuring approximately 3 inches by 4 inches. In the mounting procedure, each slab was first stretched 40% in a width wise direction. The mounted slabs were then submersed in a grafting media for 5 minutes at room temperature, the media being prepared by mixing 154 ml. trifluoroacetic acid and 538 ml. of 30% hydrogen peroxide. The slabs were then removed from their frames, rinsed in distilled water, and placed in a sodium hydroxide solution at a pH of 9.0 to 9.5 for 2 hours at room temperature. After overnight rinsing in distilled water, the slabs were dried in a forced air oven for 4 hours at 30° C.

Figure 2:
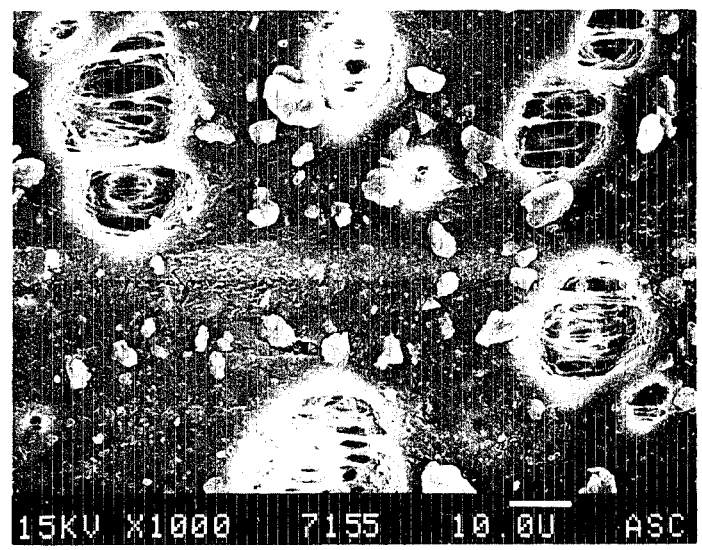
FIG. 2 is a photomicrograph of the same latex sheet following ozone exposure.
Figure 3:
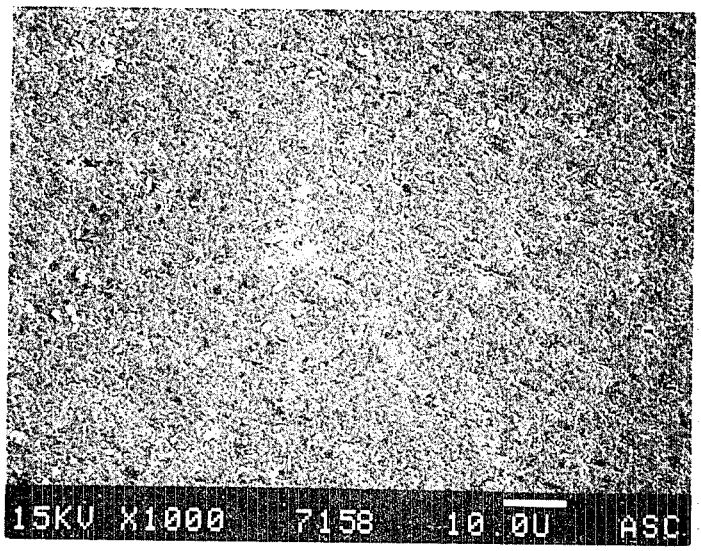
FIG. 3 is a photomicrograph of a latex sheet having a fluorocarbon layer grafted to the surface thereof, such sheet being illustrated prior to ozone exposure.
Figure 4:
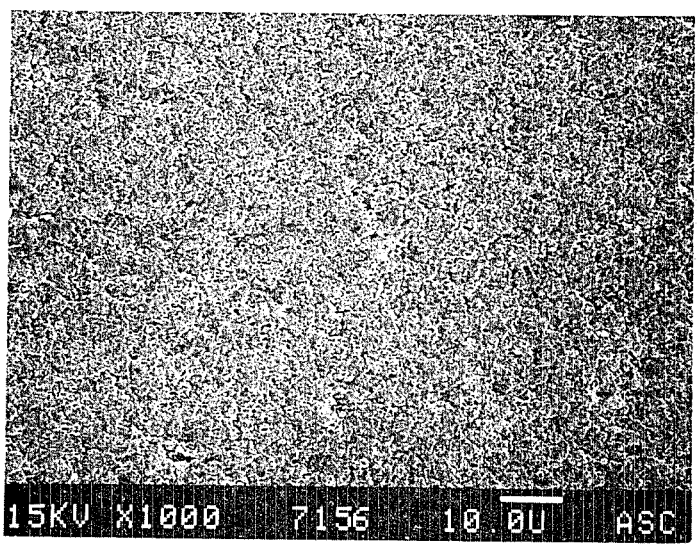
FIG. 4 is a photomicrograph showing the grafted sheet of FIG. 3 following ozone exposure.

Each slab was then placed in a chamber containing ambient air with 0.2 ppm ozone for 6 hours at room temperature with such slabs in a 40% uniaxially stretched condition mounted upon the support frames as before. Following such treatment, the grafted slabs were examined with an electron microscope and were compared with ungrafted latex slabs which had otherwise been treated identically with the grafted counterparts. FIG. 1 is a photomicrograph of an ungrafted latex slab prior to ozone treatment, the slab being stretched laterally (as shown on the page) 40%. 15 KV represents the accelerating voltage of the electron microscope in kilovolts, 1000 represents the magnification, and 10.0$\nu$ represents the length in microns of the bar shown directly above that numeral. FIG. 2 is a photomicrograph of the same slab after ozone treatment. The large fissures and openings clearly reveal the extent of disintegration of the untreated slab. FIG. 3 depicts a grafted latex slab prior to ozone treatment, the condition of the slab being generally the same in appearance as that of the ungrafted latex slab before ozonation (FIG. 1). FIG. 4 is a photomicrograph showing the grafted latex slab of FIG. 3 after ozone treatment. A comparison of FIGS. 3, 4, and 2 makes it clear that ozone exposure had no apparent effect on the fluorocarbon-grafted latex surface, in sharp contrast to the destructive effect on the ungrafted surface.

EXAMPLE 3

Latex slabs were grafted in accordance with the procedure of Example 2 and were then compared with non-grafted latex slabs to determine differences in gas permeability. Nitrogen was selected as the gas for this test because of inertness with respect to latex. Each latex slab was sealed within a diffusion chamber, being braced therein against stretching by a metal screen and filter-paper pad. One side of the slab was exposed to nitrogen under pressure of 700 psi and a temperature of 24.5° C. The portion of the chamber on the opposite of the slab communicated with a bubble generator and a measuring tube of 1.0160 mm. inside diameter. Permeability was calculated by measuring the time required for a soap bubble to travel 20.0 cm. within the measuring tube. Such calculations revealed that the fluorocarbon grafting of the surfaces of the latex slabs reduced permeability to the order of about 30%, indicating that a grafting treatment either reduced the number of submicroscopic pores or holes in the substrate, or reduced the sizes of such pores or holes.

EXAMPLE 4

Acrylonitrile-butadiene-styrene (ABS) copolymer was dissolved in tetrahydrofuran (THF) to make a 30% solution. Slabs were solution cast and the THF was allowed to evaporate. The dried slabs were then immersed in a solution made up as follows:

Trifluoroacetic acid: 154 ml.
Hydrogen peroxide (30%): 538 ml.

The slabs were immersed in this solution at an ambient temperature of 25° C. for periods up to 24 hours. They were then removed from the reaction bath and rinsed in running tap water at room temperature. Thereafter, the slabs were placed in a sodium hydroxide solution having a pH of 9.0–9.5 for two hours at room temperature, rinsed thoroughly in running tap water and then in distilled water, and then allowed to dry under ambient conditions. The dried ABS grafted polymer slabs were lubricious to the touch. An ungrafted ABS polymer slab retained for comparison purposes was not lubricious.

EXAMPLE 6

The following procedure revealed that the solvent system for the grafting media need not be aqueous. Two grafting solutions were prepared, each having the following compositions:

| | Solution A (ml) | Solution B (ml) |
|---|---|---|
| Trifluoroacetic acid | 5 | 5 |

| | Solution A (ml) | Solution B (ml) |
|---|---|---|
| $H_2O_2$ (50%) | 10 | 10 |
| Isopropyl alcohol | 10 | 0 |
| $H_2O$ | 0 | 10 |

A latex slab was placed in each solution for a period of 5 minutes. Thereafter, the slabs were rinsed and dried. Examination revealed the surfaces of both latex slabs to be lubricious, having the same properties observed in the procedure of Example 1. The slab grafted in solution A had a whiter surface appearance and appeared to be more lubricious than the slab grafted in solution B.

EXAMPLE 6

Cured natural latex balloons were leached and dried, and were then grafted in a trifluoroacetic acid media, using the leaching and grafting solutions and procedures set forth in Example 1. The balloons were submersed in the grafting media both in the inflated and in the uninflated state. The inflated balloons were at several 100% elongation. The grafting time was 30 seconds at ambient conditions. The balloons were then stabilized and leached as described in Example 1. The dry balloons were then securely fastened on a vinyl shaft at 40% stretch and were exposed to ozone at 0.2 ppm at room temperature for 2 hours.

The balloons were then examined with the aid of a scanning electron microscope. The balloon with no surface conversion showed signs of ozone attack evidenced by surface cracks, holes, and discontinuities in the rubber. The balloon grafted in the uninflated state showed some signs of ozone attack, although not as severe as with the ungrafted balloon. The balloon that was grafted in the inflated state showed no evidence of ozone attack.

EXAMPLE 7

A cured natural latex rubber tube was placed in a peroxidation medium for 2 minutes at 45°–50° C. The peroxidation medium consisted of equal volumes of peroxyacetic acid and distilled water. The tube was removed and rinsed in distilled water and was then placed in a solution consisting of 20 ml trifluoroethanol and 3 ml HCl (1N) for 50 minutes at 50° C. The tube was then water leached, air dried, and examined for lubricity. It was obvious by touch that the grafted tube had a significant reduction in its surface frictional properties as compared to the ungrafted tube.

While in the foregoing we have disclosed embodiments of the invention in considerable detail for purposes of illustration, it will be understood by those skilled in the art that many of these details may be varied without departing from the spirit and scope of the invention.

We claim:

1. An article comprising a preformed solid or semi-solid polymeric substrate containing carbon-carbon groups joined by double bonds, said substrate having a surface covered by a lubricious hydroxy-fluorocarbon graft bonded to said carbon-carbon groups at said surface and comprising hydroxy and fluoroester linkages pendant from the respective carbons of each of said surface groups, said linkages substantially eliminating the carbon-carbon double bonds at said surface and being hydrolytically stabilized by intramolecular hydrogen bonding.

2. The article of claim 1 in which said ester linkage comprises the ester of trifluoroacetic acid.

3. The article of claim 1 in which said substrate is an elastomer.

4. The article of claim 3 in which said elastomer is a polymer formed from monomeric units selected from the group consisting of isoprene and butadiene.

5. The article of claim 4 in which said elastomer is latex.

6. An article comprising a preformed solid or semi-solid polymeric substrate containing aliphatic carbon-carbon unsaturation and having pendant from adjacent carbon-carbon groups at a surface of said substrate the respective pendant groups

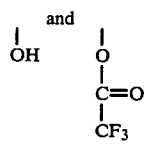

and wherein said pendant groups occupy substantially all sites of unsaturation at said surface and are hydrolytically stabilized by hydrogen bonding therebetween.

7. The article of claim 6 in which said polymeric substrate is elastomeric.

8. The article of claim 7 in which said elastomeric substrate is a polymer formed essentially of monomeric units selected from the group consisting of isoprene and butadiene.

9. The article of claim 8 in which said elastomeric substrate is formed of latex.

10. A process for forming a lubricious and ozone-resistant outer layer on a preformed substrate having carbon-carbon double bonds at the surface thereof, comprising the steps of epoxidizing said surface of said substrate at the sites of said double bonds without dissolving or otherwise significantly altering the sub-surface structure of said substrate, and reacting the epoxide groups so formed with a fluorocarbon capable of cleaving the epoxide rings and covalently bonding thereto.

11. The process of claim 10 in which said epoxidation and reacting steps are performed below 100° C. by exposing the surface of said substrate to a solution containing peroxytrifluoroacetic acid.

12. The process of claim 11 in which said epoxidizing and reacting steps are performed at temperatures within the range of 10° to 40° C.

13. The process of claim 12 in which said steps are performed at approximately room temperature.

14. The process of claims 10, 11, 12 or 13 in which said substrate is an elastomer.

15. The process in claim 14 in which said substrate is an elastomer formed from monomeric units selected from the group consisting of isoprene and butadiene.

16. The process of claim 15 in which said elastomer is a natural latex rubber.

17. The process of claims 11, 12, or 13 in which there is the further step of immersing the reacted substrate in an aqueous bath maintained at a pH within the range of about 8 to 11 to hydrolytically stabilize said outer layer by converting diester groups to hydroxy ester groups.

18. The process of claim 17 in which said pH is maintained between 9 to 10.

19. The process of claim 18 in which said aqueous bath is maintained at a temperature within the range of about 10° to 40° C.

20. The process of claim 18 in which said bath is maintained at approximately room temperature.

21. The process of claim 17 in which said substrate is an elastomer.

22. The process of claim 21 in which said substrate is an elastomer formed primarily from monomeric units selected from the group consisting of isoprene and butadiene.

23. The process of claim 22 in which said substrate is latex.

* * * * *

UNITED STATES PATENT AND TRADEMARK OFFICE
CERTIFICATE OF CORRECTION

PATENT NO. : 4,595,632

DATED : June 17, 1986

INVENTOR(S) : Mayhan, Kenneth G., Janssen, Robert A., Drake, Roger F.

It is certified that error appears in the above-identified patent and that said Letters Patent is hereby corrected as shown below:

Column 8, line 60, cancel "6", substitute "5"

Column 11, line 6, cancel "unitss", substitute "units"

Signed and Sealed this

Fourteenth Day of October, 1986

[SEAL]

Attest:

DONALD J. QUIGG

*Attesting Officer*   *Commissioner of Patents and Trademarks*